US012530343B2

(12) United States Patent
Priebe et al.

(10) Patent No.: US 12,530,343 B2
(45) Date of Patent: *Jan. 20, 2026

(54) DATABASE TRANSACTION LOG WRITING AND INTEGRITY CHECKING

(71) Applicant: Microsoft Technology Licensing, LLC, Redmond, WA (US)

(72) Inventors: Christian Priebe, London (GB); Kapil Vaswani, Cambridge (GB); Manuel Silverio Da Silva Costa, Cambridge (GB)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/608,834

(22) Filed: Mar. 18, 2024

(65) Prior Publication Data

US 2024/0220483 A1   Jul. 4, 2024

Related U.S. Application Data

(63) Continuation of application No. 17/412,165, filed on Aug. 25, 2021, now Pat. No. 11,966,385, which is a (Continued)

(30) Foreign Application Priority Data

Feb. 1, 2018  (GB) ...................... 1801679

(51) Int. Cl.
*G06F 16/30* (2019.01)
*G06F 11/14* (2006.01)
(Continued)

(52) U.S. Cl.
CPC ...... *G06F 16/2379* (2019.01); *G06F 11/1469* (2013.01); *G06F 16/2358* (2019.01); (Continued)

(58) Field of Classification Search
CPC ............ G06F 16/2379; G06F 16/2358; G06F 16/2365
See application file for complete search history.

(56) References Cited

U.S. PATENT DOCUMENTS

2006/0224636 A1* 10/2006 Kathuria ............. G06F 11/1471
2007/0005664 A1*  1/2007 Kodavalla ........... G06F 11/1471
(Continued)

OTHER PUBLICATIONS

Communication pursuant to Article 71(3) EPC, Received for European Application No. 19704941.4, mailed on Oct. 14, 2024, 8 pages.
(Continued)

*Primary Examiner* — Khanh B Pham
(74) *Attorney, Agent, or Firm* — Barta Jones, PLLC

(57) ABSTRACT

In various examples, there is provided a computer-implemented method for writing transaction log entries to a transaction log for a database system. At least part of the database system is configured to be executed within a trusted execution environment. The transaction log is stored outside of the trusted execution environment. The method maintains a first secure count representing a number of transaction log entries which have been written to the transaction log for transactions which have been committed to the database and writes a transaction log entry to the transaction log. In other examples, there is also provided is a computer-implemented method for restoring a database system using transaction log entries received from the transaction log and a current value of the first secure count.

20 Claims, 6 Drawing Sheets

Related U.S. Application Data continuation of application No. 15/955,681, filed on Apr. 17, 2018, now Pat. No. 11,120,011.

(51) Int. Cl.
*G06F 16/23* (2019.01)
*G06F 21/57* (2013.01)
*G06F 21/60* (2013.01)
*G06F 21/64* (2013.01)

(52) U.S. Cl.
CPC .......... *G06F 16/2365* (2019.01); *G06F 21/57* (2013.01); *G06F 21/602* (2013.01); *G06F 21/64* (2013.01); *G06F 2201/87* (2013.01)

(56) References Cited

U.S. PATENT DOCUMENTS

2019/0236168 A1    8/2019   Vaswani
2022/0207173 A1*   6/2022   Mwaura ............... G06F 16/2379

OTHER PUBLICATIONS

Communication pursuant to Rules 70(2) and 70a(2) EPC and reference to Rule 39(1) Received in European Patent Application No. 25158546.9, mailed on May 7, 2025, 2 pages.

Decision to grant a European patent pursuant to Article 97(1) received in European Application No. 19704941.4, mailed on Feb. 20, 2025, 3 pages.

Extended European Search Report received for EP Application No. 25158546.9, mailed on Mar. 28, 2025, 08 pages.

Intimation of the Grant and Recordal of Patent Under Section 43 of the Act Received for Indian Application No. 202017030142, mailed on Mar. 24, 2025, 01 page.

Intimation of the grant Received for Indian Application No. 202017030143, mailed on Oct. 10, 2024, 1 page.

Notification on grant Received for Chinese Application No. 201980011015.9, mailed on Jan. 25, 2024, 4 pages (English Translation Provided).

Second Office Action Received for Chinese Application No. 201980011015.9, mailed on Oct. 31, 2023, 7 pages (English Translation Provided).

* cited by examiner

DATABASE TRANSACTION LOG WRITING AND INTEGRITY CHECKING

CROSS-REFERENCE TO RELATED APPLICATION(S)

This non-provisional utility application is a continuation of Ser. No. 17/412,165, entitled "DATABASE TRANSACTION LOG WRITING AND INTEGRITY CHECKING", filed on Aug. 25, 2021, which is a continuation of and claims priority to U.S. application Ser. No. 15/955,681 (now U.S. Pat. No. 11,120,011, entitled "DATABASE TRANSACTION LOG WRITING AND INTEGRITY CHECKING," filed on Apr. 17, 2018, which claims priority to GB patent application number 1801679.0 entitled "DATABASE TRANSACTION LOG WRITING AND INTEGRITY CHECKING," filed on Feb. 1, 2018. This pending non-provisional application claims priority to all of these previously filed applications, which are incorporated herein by reference in their entireties.

BACKGROUND

The technology generally relates generally to database systems and more specifically to database systems which are, at least partially, executed within a trusted execution environment and make use of a transaction log stored outside of the trusted execution environment to record transactions that are applied to the database so that the transaction log may be used to recover the database by replaying the transactions recorded in the database system.

A Trusted Execution Environment (TEE), is a secure area of a processor which guarantees that code and data within the secure area is protected with respect to confidentiality and integrity. One technology which provides a TEE is the use of memory enclaves. As an example, an enclave may be created using Microsoft® Virtual Secure Mode (VSM). Alternatively, Intel® processors may include Software Guard Extensions (SGX) instructions which allow a secure enclave to be created. However, other mechanisms for creating enclaves can be used, such as AMD® Secure Encrypted Virtualization (SEV). The code and data for a particular process may be stored and/or processed within an enclave. Data and processing within the enclave is protected from other processes that may be being executed within the computer system, helping to ensure its confidentiality and integrity. Enclaves typically provide an enclave quoting mechanism which enables a user to verify that a process is actually operating inside a valid enclave and also the state of the enclave (e.g. the actual process that is within the enclave).

In-memory databases, such as provided by Microsoft® Hekaton engine store their data in tables and indexes in volatile memory. Whilst this can provide many advantages, such as improved performance, one drawback to in-memory databases is that the data stored in volatile memory is lost when the computer system that they are operating on is rebooted (such as due to power or component failure or as part of routine maintenance of the computer system). Therefore, such in-memory databases typically make use of a transaction log to allow recovery of a current state of the database following a reboot of the host computer system by replaying the transactions recorded in the log entries of the transaction log. Databases other than in-memory databases may also make use of a transaction log to allow recovery of a database's state in the event that the main storage for the database is somehow lost or corrupted (even if this doesn't ordinarily occur on a normal reboot of a host computer system).

Given that the state of the database following recovery from the transaction log (or just log) is determined by the transaction log entries that are read from the transaction log, it is desirable to provide a mechanism by which the integrity of the transaction log can be assured. Otherwise, a user with access (either authorized or unauthorized) to the transaction log can, either intentionally or accidentally, alter the log, thereby changing the state of the database system when it is restored from the log. Whilst mechanisms exist for verifying the integrity of individual log entries, such as by including a signed hash of the log entries contents in the log file, it is also desirable to ensure that the collection of log entries in the log is itself unchanged.

Merkle trees provide one possible solution for ensuring the integrity of the collection of log entries. Merkle trees are a tree data structure in which every leaf node is labelled with the hash of a data block and every non-leaf node is labelled with the cryptographic hash of the labels of its child nodes. However, maintaining a Merkle tree for highly concurrent and write-intensive workloads, such a database transaction log can be computationally intensive. This is because, when writing to a leaf node of a Merkle tree, each of the parent nodes also need to be updated. Therefore, when maintaining a transaction log using a Merkle tree, it is necessary for a process which is appending a log entry to the transaction log to obtain locks on a leaf node and each of its parent nodes. Since a database transaction log is an append-only workload and may make use of a large number of different transaction processing threads to process transactions simultaneously, a transaction log based on a Merkle tree can introduce significant contention and end up being a bottleneck in the database system. This is because each the transaction processing threads will be attempting to write to roughly the same set of nodes in the Merkle tree and will therefore end up competing with each other (and having to wait) to obtain the locks necessary to append a log entry to the transaction log.

When a transaction log becomes too big, a database system can combine a number of entries in the log together into a snapshot of the database system. Such snapshots completely represent the state of the database at a particular point in time. The database system can then truncate (or remove) the log entries that have been combined into a snapshot from the transaction log since they are no longer needed to restore the database. Instead, the database can be restored using a latest snapshot as a starting point and replaying the remaining transaction log entries from the transaction log. Of course, the database system may still keep copies of the truncated transaction log entries outside of the transaction log if desired (possible, for example, to allow for auditing/review of the transactions that have taken place).

The embodiments described below are not limited to implementations which solve any or all of the disadvantages of known transaction logging techniques for database systems.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples, there is provided a computer-implemented method for writing transaction log entries to a transaction log for a database system. At least part of the database system is configured to be executed within a trusted execution environment. The transaction log is stored outside of the trusted execution environment. The method maintains a first secure count representing a number of transaction log entries which have been written to the transaction log for transactions which have been committed to the database and writes a transaction log entry to the transaction log. In other examples, there is also provided is a computer-implemented method for restoring a database system using transaction log entries received from the transaction log and a current value of the first secure count.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
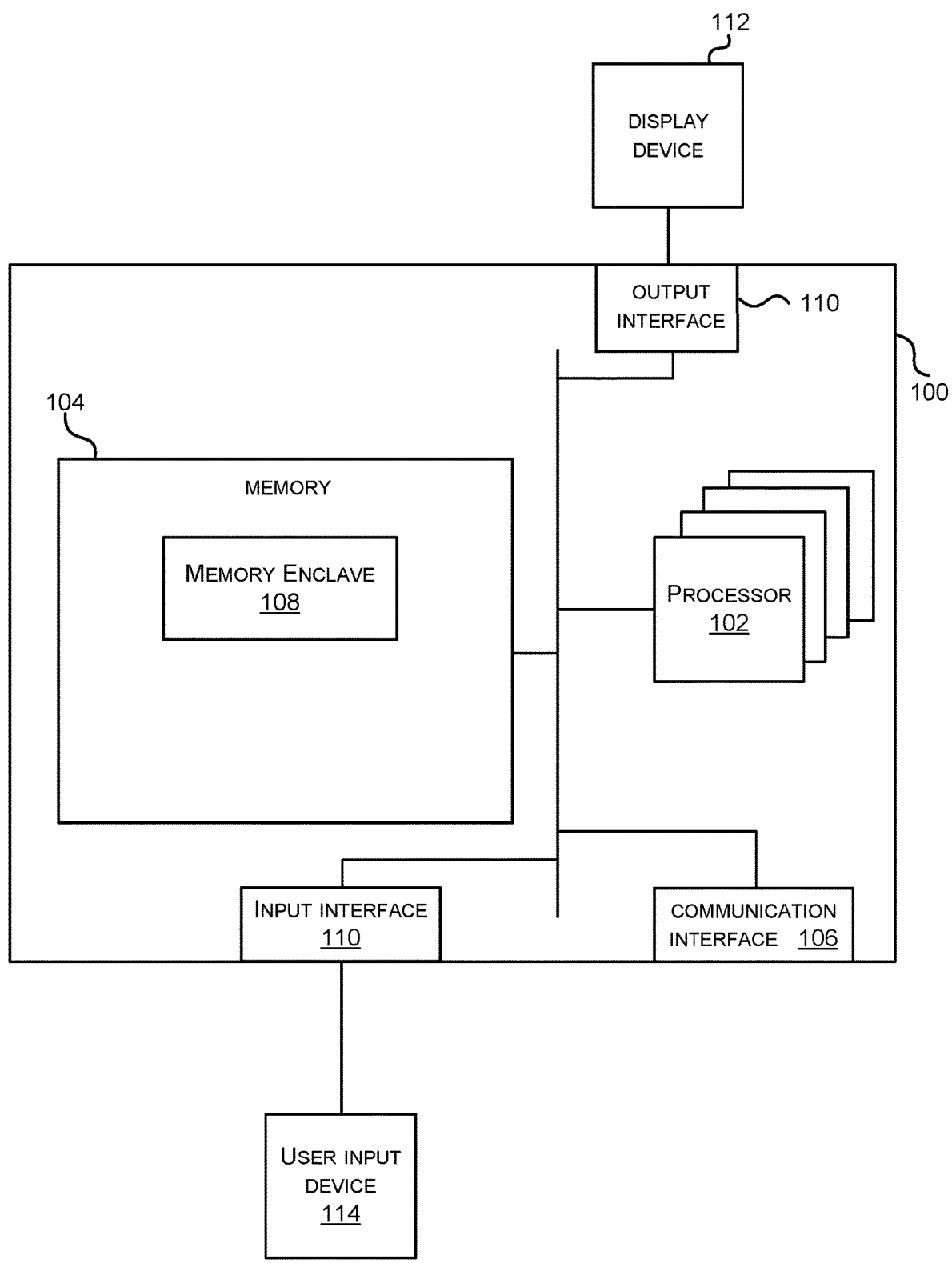
FIG. 1 illustrates an exemplary computing-based device in which embodiments of the database system are implemented.

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

In an example, there is a database system configured such that at least part of the database system is configured to be executed within a trusted execution environment, the database system comprising: a transaction logger configured to write transaction log entries to a transaction log stored outside of the trusted execution environment, each of the transaction log entries representing a transaction processed by the database system; a first secure counter configured to maintain a representation of the number of transaction log entries which have been written to the transaction log for transactions which have been committed to the database; and a restoration module configured to restore the database system based, at least in part, on transaction log entries retrieved from the transaction log and a current value of the first secure counter.

In another example, there is provided a computer-implemented method for writing transaction log entries to a transaction log for a database system, wherein at least part of the database system is configured to be executed within a trusted execution environment and the transaction log is stored outside of the trusted execution environment, the method comprising: maintaining a first secure count representing a number of transaction log entries which have been written to the transaction log for transactions which have been committed to the database; and writing a transaction log entry to the transaction log.

In another example, there is provided a computer-implemented method for restoring a database system, wherein at least a part of the database system is configured to be executed within a trusted execution environment, the method comprising: receiving one or more transaction log entries retrieved from a transaction log stored outside of the trusted execution environment, each of the one or more transaction log entries representing a transaction processed by the database system; and receiving a current value of a first secure count maintained by the database system, the first secure count representing the number of transaction log entries which have been written to the transaction log for transactions which have been committed to the database; verifying the integrity of the transaction log based, at least in part, on the current value of the first secure count by determining that a correct number of transaction log entries has been received; and in response to verifying the integrity of the received transaction log entries, restoring the database using the received transaction log entries and the current value of the first secure count.

By using a secure counter to track the number of transaction log entries which have been written to a transaction log for transactions which have been committed to the database, the database system is able to verify that the number of transaction log entries that it receives from the transaction log contains a sufficient number of transaction log entries. Since the secure counter is separate from the transaction log, both the counter and the transaction log would need to be changed in a manner such that they still correspond to one another in order for the database system to not be able to verify that at least the correct number of transaction log entries have been received.

Although the present examples are described and illustrated herein as being implemented in a computer system, the system described is provided as an example and not a limitation. As those skilled in the art will appreciate, the present examples are suitable for application in a variety of different types of computer systems.

FIG. 1 is a schematic diagram illustrating various components of an exemplary computing-based device 100 which are implemented as any form of a computing and/or electronic device, and in which embodiments of the database system are implemented in some examples.

Computing-based device 100 comprises one or more processors 102 which are microprocessors, controllers or any other suitable type of processors for processing computer executable instructions to control the operation of the device according to the embodiments of the database system or the method for interacting with the database system. In some examples, for example where a system on a chip architecture is used, the processors 102 include one or more fixed function blocks (also referred to as accelerators) which implement a part of the database system in hardware (rather than software or firmware). Platform software comprising an operating system or any other suitable platform software is provided at the computing-based device to enable the database system or the method of interacting with the database system to be executed on the device.

The computer executable instructions are provided using any computer-readable media that is accessible by computing based device 100. Computer-readable media includes, for example, computer storage media such as memory 104 and communications media. Computer storage media, such as memory 104, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 104) is shown within the computing-based device 100 it will be appreciated that the storage is, in some examples, distributed or located remotely and accessed via a network or other communication link (e.g. using communication interface 106).

The processor 102 supports the creation of a memory enclave 108 within the memory 104 of the computing based device 100. As an example, an enclave may be created using Microsoft® Virtual Secure Mode (VSM). Alternatively, Intel® processors may include Software Guard Extensions (SGX) instructions which allow a secure enclave to be created. However, other mechanisms for creating enclaves can be used, such as AMD® Secure Encrypted Virtualization (SEV)

The computing-based device 100 also comprises an input/output controller 110 arranged to output display information to a display device 112 which may be separate from or integral to the computing-based device 100. The display information may provide a graphical user interface. The input/output controller 110 is also arranged to receive and process input from one or more devices, such as a user input device 114 (e.g. a mouse, keyboard, camera, microphone or other sensor). Of course, in some examples, the computing-based device may operate as a headless server, without a permanently connected display device 112 or user input device 114. In this configuration, the computing-based device 100 may rely on communication interface 106 for all input/output.

Alternatively, or in addition, the functionality described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 2:
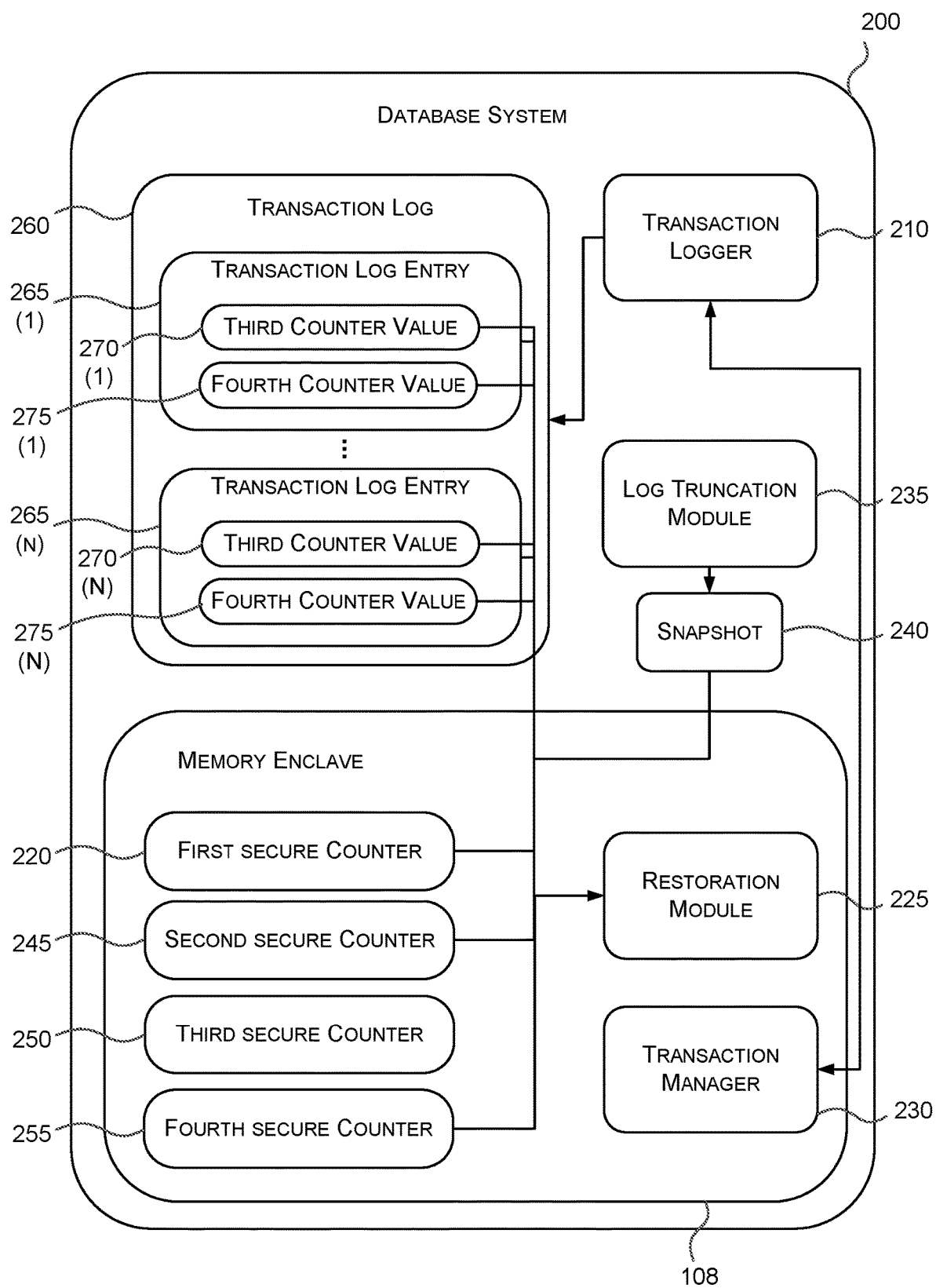
FIG. 2 illustrates an exemplary database system which may operate on the computing device illustrated in FIG. 1.

FIG. 2 is a schematic diagram of an exemplary database system 200 which may operate on computing device (or host computer system) 100. The database system comprises a transaction logger 210, a transaction log 260, a first secure counter 220, a restoration module 225. Additionally, the exemplary database system 200 illustrated in FIG. 2 comprises a log truncation module 235, a second secure counter 245, a third secure counter 250 and a fourth secure counter 255 and a transaction manager 230. However, it will be appreciated (as discussed below) that these additional components are optional and may be omitted or replaced by alternative components in other examples. The database system 200 is configured such that at least part of the database system 200 is configured to be executed within a memory enclave 108 (although other forms of trusted execution environment may be used instead). In the example shown in FIG. 2, the database system is configured such that the first, second, third and fourth secure counters, as well as the restoration module 225 and transaction manager 230 are executed inside of the memory enclave 108. However, it will be appreciated that, in other examples, a greater or fewer number of components or different components are executing inside the memory enclave 108 instead. In general, in most examples, the components executing inside the memory enclave 108 allow the database system 200 to guarantee the confidentiality and/or integrity of data that it is operating on. In some examples, the first, second, third and fourth secure counters are not stored in the same memory enclave, for example, each of the first, second, third and fourth secure counters may be executed in their own separate memory enclaves.

The transaction logger 210 is configured to write transaction log entries 265 to a transaction log 260 which is stored outside of the memory enclave 108. Accordingly, the transaction log 260 contains a plurality of transaction log entries 265. In the example, each new transaction log entry 265 written by the transaction logger 210 is appended to the end of the transaction log. Optionally, in some examples, such as that illustrated in FIG. 2, the transaction log entries 265 include indications of the values of the third and/or fourth secure counters at the time the transaction log entries 265 were written to the transaction log 265.

Since the transaction log 260 is outside of the memory enclave (or trusted execution environment), it is not protected, in terms of confidentiality and/or integrity, by the mechanisms of the memory enclave 108. Accordingly, in some examples, where the confidentiality of the log is important, the transaction log entries may be encrypted using a securely stored encryption key. The encryption key may be stored, for example, sealed within the enclave 108. Meanwhile, the secure counters 220, 245, 250 and 255, together with the indications 270 and 275 of the third and fourth counter values that are stored in each transaction log entry may be used in various examples to provide assurances about the integrity of log entries 265 which are read from the transaction log 260.

In the example illustrated in FIG. 2, the transaction logger 210 is instructed to write entries 265 to the log by the transaction manager 230 which is executing inside of the enclave 108.

The transaction manager 230 manages the processing of transactions by the database system 200. A transaction is a set of operations to store data in the database which are to be performed atomically. That is to say, either all of the operations in the set are applied to the database or none of them are. The transaction manger 230 manages the operations of each transaction that is applied to the database to ensure that all of the operations in each transaction are applied to the database, or, where one or more of the operations cannot be applied to the database, to roll-back any of the operations that have been applied to the database. Once of the operations in a transaction have been applied to the database, the transaction manager 230 provides confirmation to the entity that requested the transaction be applied to the database that the transaction has been successfully completed (or committed) to the database as part of a commit callback procedure. The storing of a log entry representing a transaction is considered to be part of the operations that are performed in processing the transaction. This is because, until the transaction has been logged in the transaction log 260, the transaction manager 230 cannot guarantee that the data will be available if the database system 200 needs to be restored from the transaction log 260. Therefore, in order to prevent loss of data, the transaction manager 230 (or other component managing the processing of transactions for the database system) does not provide confirmation that the transaction has been committed to the database to the entity that requested the transaction be performed until the transaction logger 210 has confirmed that the transaction log entry 265 for that transaction has been written to the transaction log 260. This is because once an entity receives confirmation that a transaction has been committed, the entity can (and frequently will) discard its copy of the data that was contained in the transaction on the understanding that this data is now safely stored in the database. Because of this way of operating, the transaction log 260 may contain log entries 265 representing transactions which have been committed to the database (i.e. where the transaction manager 230 has provided confirmation that the transaction has been committed to the database to a requesting entity) and those which are not yet committed to the database (i.e. where the transaction manager 230 has not yet provided confirmation that the transaction has been committed to the database to the requesting entry). These transactions which have log entries 265 written in the transaction log 260 but have not yet been considered to be committed to the database may be referred to as non-committed or hidden transactions. Since the requesting entity may attempt to resubmit any non-committed transactions (i.e. transactions where the requesting entity has not yet been provided with confirmation that the transaction has been committed), in some examples (as discussed in more detail below), the database system 200 provides a mechanism to prevent such hidden transaction from being restored to the database system 200 when restoring from the transaction log 260.

The first secure counter 220 is used by the database system 200 to maintain a count representing the number of transaction log entries 265 that have been written to transaction log 260 for which the corresponding transactions have been committed to the database. That is to say, the number of transaction log entries 265 in the transaction log 260 for which confirmation that the corresponding transaction has been committed to the database has been provided to the requesting entity. The use of the first secure counter 220 will be described further below.

The log truncation module 235 truncates the transaction log 260 by generating a snapshot 240 of the database system 200 at a particular point in time. The snapshot 240 effectively combines all the transaction log entries 265 occurring before the particular point in time at which the snapshot 240 is taken. In some examples, there are two types of snapshot that may be produced—data snapshots which represent the rows that have been inserted or updated since the previous snapshot and delta snapshots which represent rows which have been delete since the previous snapshot. In such examples, the latest snapshot 240 is considered to comprise all previous data and delta snapshots that have been taken up to and including the most recent ones. The database system 200 can then be restored by using the latest snapshot 240 and any transaction log entries 265 for transactions occurring after the snapshot 240 was taken. This means that transaction log entries 265 occurring before the point in time that the snapshot 240 was taken can be removed from the transaction log 260 (or truncated) without affecting the ability for the database system 200 to be restored. The log truncation module 235 operates to ensure that only transaction log entries 265 relating to transactions which have been committed to the database are included in the snapshot 240. Therefore, when truncating the log 260 (and generating a snapshot 240) the log truncation module 235 identifies a point in the transaction log 260 at which all log entries 265 prior to that point relate to transactions which have been committed. In some examples, the log truncation module 235 identifies the latest point in time within the log at which all log entries 265 prior to that point relate to transactions which have been committed. By excluding log entries 265 relating to transactions which have not been committed, the log truncation module 235 can ensure the integrity of the snapshot, even if the database goes offline before all transactions for which log entries 265 have been written to the log 260 have been committed.

In examples where the database system comprises a log truncation module 235 (i.e. in databases where truncation of the transaction log 260 is supported), there is the possibility of reinserting the truncated log entries back into the transaction log 260, thereby effectively causing those transactions to occur twice when the database system 200 is restored from the transaction log 260 (once due to the effect that the transaction had on the snapshot that was generated and once when the transaction log entry 265 is replayed on the snapshot). Therefore, in examples, a technique is provided for preventing this from happening, as discussed in more detail below.

Additionally, when restoring the database it is necessary to ensure that the latest snapshot 240 is used to restore the database system 200. Otherwise, the state of the database following the restoration will be incorrect. In examples, where data and delta snapshots are produced, this comprises checking that all previously taken data and delta snapshots up to and including the most recent ones are used. To ensure that the latest snapshot is provided the database system 200 maintains a cryptographic hash for each data and delta file. The hash is updated as blocks are added to the file. Once all writes to a checkpoint file have completed, the hash is saved in the system table along with the file name. The database system 200 checks the integrity of all checkpoint file pairs read during recovery by comparing the hash of their contents with the hash in the root file. Next, the database system 200 uses a state-continuity protocol based on Ariadne (see R. Strackx and F. Piessens *"Ariadne: A Minimal Approach to State Continuity"*, in $25^{th}$ USENIX Security Symposium (USENIX Security 16). Austin, TX: USENIX Association, 2016, pp. 875-892 for more details on this protocol) to save and restore the system table within the root file while guaranteeing integrity, freshness and liveness.

The second secure counter 245 is used by the database system 200 to maintain a count representing the number of transaction log entries 265 which have been truncated by the log truncation module 235. By combining the information provided by the first secure counter 220 and the second secure counter 245, the database system is enabled to determine how may transactions log entries (for committed transactions) should be present in the transaction log. Specifically, the difference between the first counter and the second secure counter 220 represents the number of committed transaction log entries 265 which should be in the transaction log 260. Of course, the second secure counter 245 is omitted in other examples of the database system 200. The function performed by the second secure counter 245 will be described further below.

The third secure counter 250 is used by the database system 200 to represent the number of transaction log entries 265 which have been written to the transaction log 260. In other words, the third secure counter 250 represents the total number of transaction log entries 265 which have been written to the transaction log regardless of whether the associated transactions have been committed to the database. Of course, the third secure counter 250 is omitted in other examples of the database system 200. The function performed by the third secure counter 250 will be described further below.

The fourth secure counter 255, which may be referred to as the epoch counter, is configured to be incremented during restoration of the database system 200 by the restoration module 225 at least when a value of the third secure counter 250 at the time of restoration is greater than a value of the first secure counter 220 at the time of restoration. When the value of the third secure counter 250 is greater than the value of the first secure counter 220 this indicates that hidden (i.e. non-committed) transactions may be present in the transaction log 260. In some examples, when the database is restored, as discussed further below, any hidden transactions included in the transaction log 260 may be ignored. This gives rise to the possibility that those ignored hidden transactions could be re-inserted into the transaction log and be included in a future restore of the database (when the first secure counter has been incremented to a point that its value is greater than the indications 270 of the third secure counter value contained in the previously ignored hidden transactions), thereby affecting the integrity of the database system 200. In some examples, this is prevented through the use of the fourth secure counter 255 and the inclusion in each of the transaction log entries of an indication 270 of the value of the fourth secure counter 255 at the time those log entries 265 are written to the transaction log. Any previously ignored transactions will indicate a value for the fourth secure counter 255 which is less than its current value, allowing them to be detected and ignored in future restores of the database system 200. Of course, the fourth secure counter 255 is omitted in other examples of the database system 200. The function performed by the fourth secure counter 255 will be described further below.

The secure counters, that is to say the first secure counter 220 and, where present, the second secure counter 245, third secure counter 250 and fourth secure counter 255, are all secure in the sense that they are stored in such a way that their values are persisted between reboots of the host computer system 100 on which the database system 200 operates. The secure counters are also secure in the sense that they are difficult for a malicious user of the system to tamper with.

In some examples, the secure counters are monotonic counters. That is to say, they only allow the counter to be incremented, not decremented. This provides an additional barrier to a would be attacker attempting to alter the logs because the secure counter does not provide any function to allow the count to be decremented (as would be required if log entries 265 were to be removed from the log without detection). The insertion of additional new log entries 265 into the transaction log is generally of less concern because existing mechanisms, such as encrypting the log entries 265 or signing a hash of the log entries 265 using a securely stored private key can provide a good level of protection against such attacks.

Where the secure counters are not monotonic, the representations of the different secure counts may be stored relative to the other secure counts. That is to say, instead maintaining an absolute number of transactions as the third secure count, the third secure count could be implicitly provided by summing the value of the first secure count with a counter which explicitly tracks the number hidden (i.e. non-committed) transactions that may also have log entries present in the transaction log 260. The use of a non-monotonic counter in such examples allows the counts to be decremented as well as incremented, enabling this approach to be used. As a further example of this approach, the second secure count could be implicitly provided by maintaining an explicit count of the number of log entries 265 for transactions which have been committed where those log entries have not yet been truncated. In this example, the second secure count is implicitly provided by subtracting the value of this explicit count from the value of the first secure count 240.

In some examples, the secure counters may be provided by features of the trusted execution environment within which parts of the database execute. As an example, a monotonic counter can be implemented using the wear-limited NVRAM available in the management engine. However, in alternative example, the secure counters are provided by distributed monotonic counter service, which will now be described in more detail below in conjunction with FIG. 3. The distributed monotonic counter service is potentially more flexible and efficient than using features of the trusted execution environment since monotonic counters implemented using such features can be slow to access.

Figure 3:
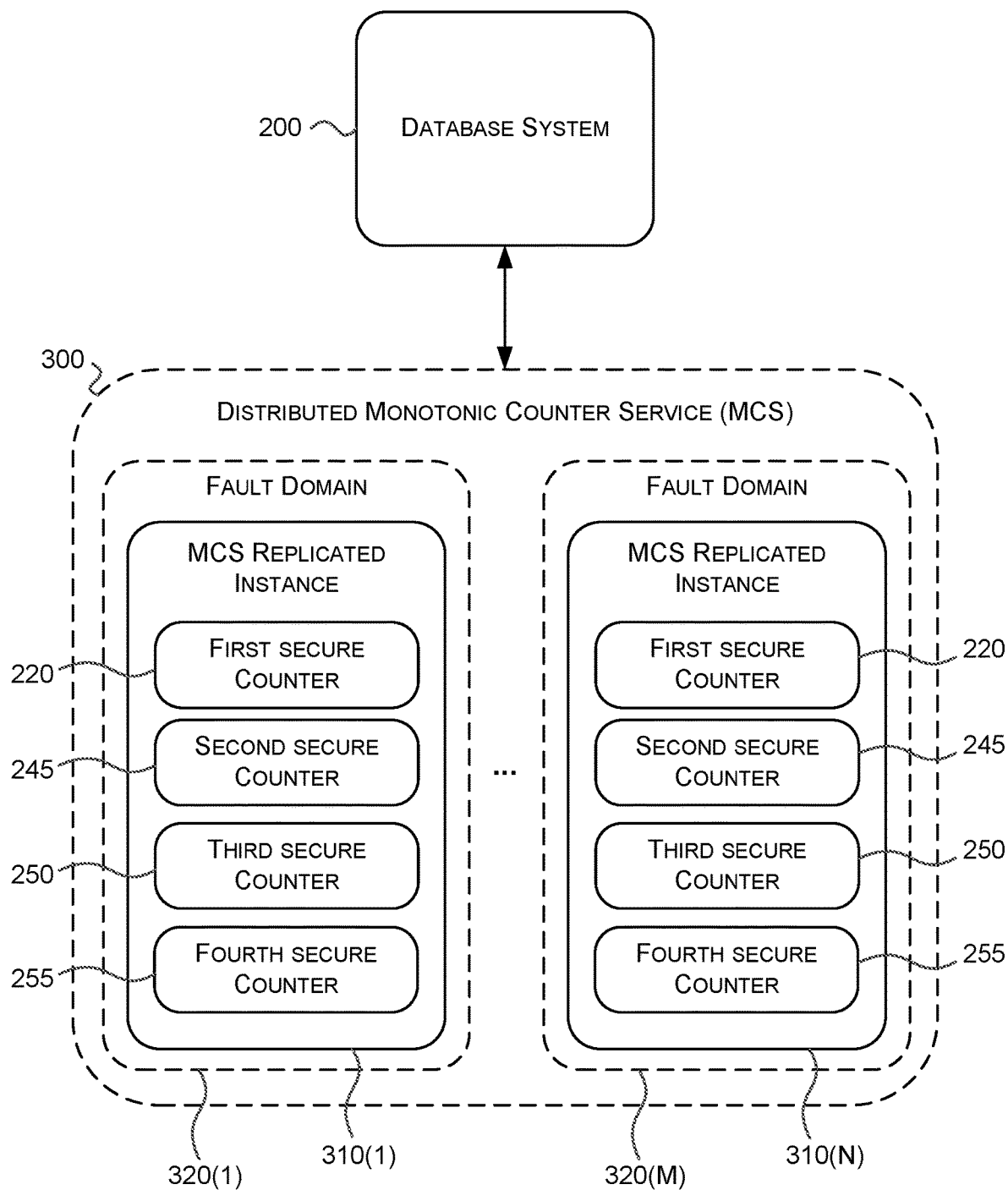
FIG. 3 illustrates an exemplary distributed monotonic counter service (MCS) with which embodiments of the database system may communicate to maintain and retrieve secure counts.

FIG. 3 is a schematic diagram of an exemplary distributed monotonic counter service (MCS) 300 with which examples of the database system 200 may communicate to maintain and retrieve the secure counts 220, 245, 250 and 255. The distributed monotonic counter service (MCS) 300 comprises two or more replicated instances 310 which are distributed across more than one fault domain 320.

A fault domain is defined by the scope with which faults have the potential to impact the provision of computational services. In other words, all services operating within a single fault domain 320 can potentially be made unavailable by a single fault within the hardware providing those services. Whereas, services operating across more than one fault domain 320 cannot be made unavailable by a single fault within the hardware providing those services. In some examples, a fault domain may also encompass all computing services within a particular geographical area which may be impacted by a single event (such as an earthquake or fire) within that geographical area. In such examples, the distribution of the replicated instances 310 of the distributed monotonic counter service 300 across more than one fault domain 320 may require some form of geographical separation between computer systems 100 operating the replicated instances 310 (however, in other examples, this needn't be the case). By distributing the monotonic counter service 300 across multiple fault domains 320, the reliability of the monotonic counter service can be very high and in general, is better the greater number of fault domains 320 the instances 310 are spread across.

Each of the monotonic counter service replicated instances 310 stores their own versions of the count for each of the secure counters. The instances 310 then determine what the current value for each of the secure counters is using a consensus (or agreement) protocol between two or more or all of the replicated instances 310. In some examples, a consensus is reached based on a majority of the replicated instances 310 storing a particular value. In some examples, a consensus may be reached if a particular number or proportion of the replicated instances 310 store a particular value. In such examples, it is not necessary for the values stored by all of the replicated instances 310 to be checked if a certain number of replicated instances 310 are already in agreement. Indeed, where some of the replicated instances 310 are rendered unavailable (for example, due to a fault in the fault domain 310 within which they operate), consensus may be reached based on those replicated instances 310 that are still available.

The use of the monotonic counter service 300 to store (or provide) the secure counters further improves the integrity of the counters. This is because, an attacker seeking to alter the secure counts to allow them to tamper with the entries 265 in the transaction log 260 would have to gain access to a number of the monotonic counter service instances 310 before they are able to affect the values of the counters that are provided from the service 300, greatly increasing the amount of effort required. This is due to the fact that the monotonic counter service 300 determines the current values from the countries based on the consensus between multiple replicated instances 310 or the service 300 meaning that simply altering the secure counter values stored in one of the instances is unlikely to affect the value of that counter which is reported by the monotonic counter service 300.

In some examples, the database system 200 is multi-threaded. That is to say, it includes a plurality of threads (which may be referred to a transaction processing threads) which can process multiple transactions in parallel. In these examples, a separate first counter 220 and, where they are present, separate second and third counters 245 and 250 are maintained for each of the threads (or conceptually, the first, second and third counters may maintain separate counts associated with each of the threads. Each of the transaction processing threads may cause transaction log entries 265 to be written to the transaction log 260 as they independently process different transactions. In these examples, the transaction log entries 265 that are written to the transaction log 260 each include an indication of which of the transaction processing threads caused that transaction log entry 265 to be written (i.e. which transaction processing thread processed the transaction associated with that transaction log entry 265). The transactions for each thread can then be restored using the respective counters for that thread.

Figure 4:
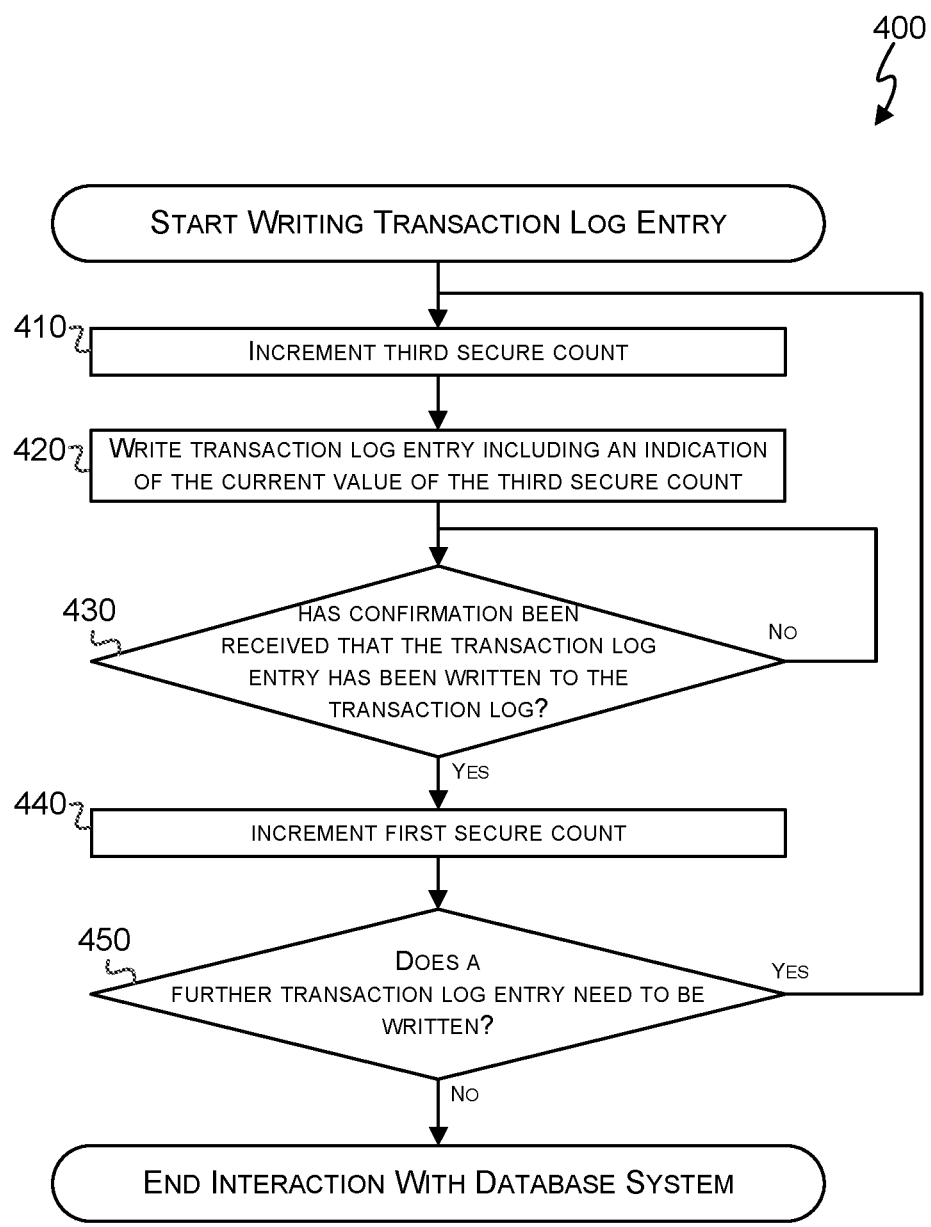
FIG. 4 is a flow diagram of an exemplary method for writing transaction log entries to a transaction log.

FIG. 4 is a flow diagram of an exemplary method 400 for writing transaction log entries 265 to the transaction log 260.

The method 400 starts at an optional operation 410, in which the method 400, increments a value increments the third secure count maintained by the third secure counter 250. This counter represents the number of transaction log entries 265 that have been written to the transaction log 260 (regardless of whether the transactions represented by those log entries have been committed to the database). By incrementing the counter first, the third secure count always reflects the maximum number of log entries 265 that should be retrievable from the transaction log. In some cases, fewer log entries may be retrievable if, for example, the host computer system 100 is rebooted before a transaction log entry 265 is actually written to the transaction log 260. In other examples, the third secure count need not be incremented as a first operation in the method 400, although this may introduce the possibility that the third secure counter 250 does not reflect the maximum number of log entries 265 that should be retrievable from the transaction log 260. Of course, in examples where the database system does not comprise a third secure counter 250 this operation may be omitted in which case the method 400 proceeds directly to an operation 420.

At operation 420, in which the method 400 writes a transaction log entry 265 to the transaction log 260. In the exemplary method 400 illustrated in FIG. 4, the transaction log entry 265 includes an indication 270 of the current value of the third secure counter 250. However, in other examples, where the database system does not include a third secure counter 250, the transaction log does not include this indication 270. In other examples, where the database system maintains the fourth secure counter 255 mentioned above, the transaction log entry 265 further includes an indication of the current value of the fourth secure counter 255. In yet further examples, where the database system 200 comprises a plurality of transaction processing threads, the transaction log entry 265 that is written in operation 420 further includes an indication of which transaction processing thread caused the log entry to be written to the transaction log 260. In some examples, writing the transaction log entry 265 to the transaction log 260 may comprise encrypting the log entry 265 using a securely stored encryption key. In examples, where indications of the third and/or fourth secure counters are included in each of the transaction log entries, these may be included in the log entries 265 as part of the authentication data for the log entries 265 using encrypted authentication. After writing the transaction log entry 265 to the transaction log 260, the method proceeds to an operation 430.

At operation 430, the method 400 waits for confirmation from the transaction log 260 (which may involve waiting for confirmation from the underlying storage abstraction layer and/or hardware) that the transaction log entry has been written to the transaction log 260. In other words, the method 400 waits until the transaction is safely stored such that after this point, it can be guaranteed that the transaction represented by the transaction log entry 265 will be included in any restoration of the database that is performed using the transaction log 260. Once the confirmation that the transaction log entry 265 has been written to the transaction log 260 has been received, the method proceeds to an operation 440.

At operation 440, the method 400 increments the first secure count provided by the first secure counter 220. This operation is performed prior to informing an entity which requested the transaction to be performed that the transaction has been committed as part of the transaction commit callback procedure. Therefore, the first secure count is maintained as a representation of the number of transaction log entries 265 which have been written to the transaction log for transaction which have been committed to the database. After incrementing the first secure count (and completing the transaction commit callback procedure to notify requesting entities that the transaction has been committed), the method 400 proceeds to an optional operation 450.

At optional operation 450, the method 400 determines whether there are any further transaction log entries 265 which need to be written to the transaction log 260, in which case, the method 400 re-iterates back to optional operation 410. Otherwise, the method 400 ends. In some examples, optional operation 450 is omitted such that the method 400 simply ends.

Figure 5:
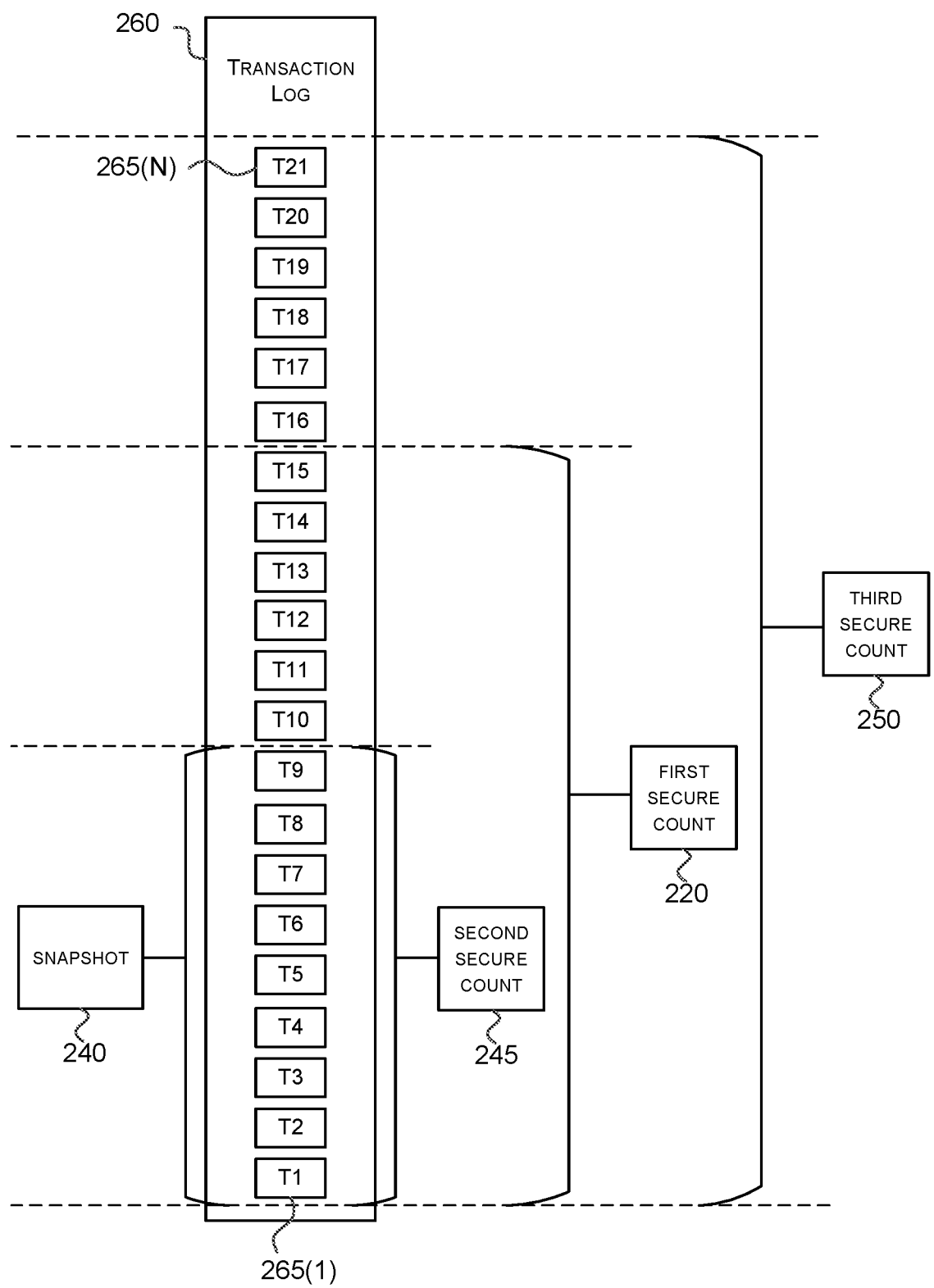
FIG. 5 is a schematic diagram illustrating exemplary relationships between the first, second and third secure counts and transaction entries within the transaction log.

FIG. 5 is a schematic diagram illustrating exemplary relationships between the first, second and third secure counts 220, 245 and 250 and transaction entries 270 within the transaction log 260. In this illustration, the transaction log 260 comprises twenty one transaction log entries 265 labelled T1 to T21.

In this example, the first nine transaction log entries 265 labelled T1 to T9 have been truncated and combined into a snapshot 240. Therefore, when recovering the database system 200 using this exemplary transaction log 260 illustrated in FIG. 5, the twelve transaction log entries labelled T10 to T21 will be provided (since these have not been truncated from the transaction log), and the database system will need to use the snapshot 240 in conjunction with these transaction log entries 265 to recover the database system 200.

Continuing the example, out of the remaining non-truncated log entries, six log entries, labelled T10 to T15 relate to transactions which have been committed to the database, whilst the remaining six non-truncated log entries, labelled T15 to T20 relate to hidden transactions which have yet to be committed to the database.

Therefore, the value of the first secure count 220 in this example is fifteen, because fifteen transaction log entries 265 have been written to the transaction log 260, nine of which have subsequently been truncated into snapshot 240 and six of which have not been truncated.

In those examples that maintain a second secure count 245, the value of the second secure count in this example is nine, because nine of the transaction log entries 265, labelled T1 to T9, have been truncated into snapshot 240. The total number of non-truncated log entries which relate to transactions that have been committed to the database system 200 is therefore obtainable by subtracting the value of the second secure count 245 from the value of the first secure count 220.

In those examples that maintain a third secure count 250, the value of the third secure count in this example is twenty one because a total of twenty one log entries 265 have been written to the transaction log 260. The total number of log entries 265 relating to hidden (or non-committed) transactions is obtainable by subtracting the value of the first secure count 220 from the value of the third secure count 250.

In examples where the transaction log entries 265 include indications 270 of the third secure counter value 250 at the time that they are written, in this example the log entries T1 to T21 may include indications of the values 1 to 21 respectively. Therefore, the truncated log entries can be identified by finding those log entries indicating a value of the third counter which is less than or equal to the value of the second secure count 245 (where a second secure count is maintained). Similarly, the non-truncated log entries which relate to transactions that have been committed to the database system 200 can be identified by finding those log entries indicating a value of the third counter which is greater than or equal the current value of the second secure count 245 (i.e. greater than nine) and less than or equal to the value of the first secure count (i.e. less than or equal to fifteen). Also, the non-truncated log entries which relate to hidden transactions can be identified by finding those log entries indicating a value of the third counter which is greater than the value of the first secure count 220 (and less than or equal to the value of the third secure count 250).

These relationships between the secure counters and the transaction log entries 265 are used by the database system 200 to verify the integrity of the transaction log entries that are used for recovery of the database system 200 and recover the database system 200 in a manner which preserves its integrity, as will now be discussed in conjunction with FIG. 6.

Figure 6:
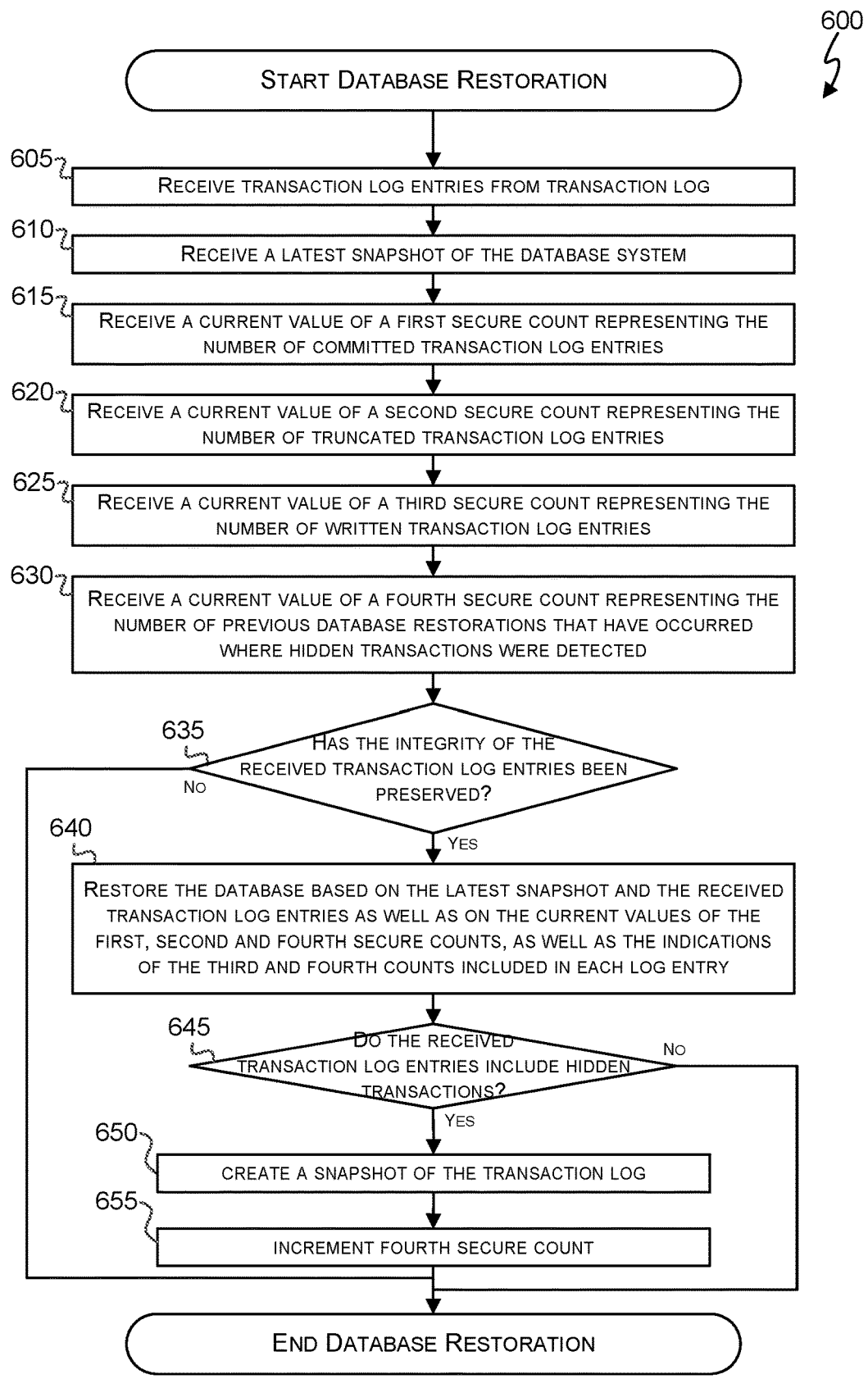
FIG. 6 is a flow diagram of an exemplary method for restoring a database using the transaction log.

FIG. 6 is a flow diagram of an exemplary method 600 for restoring the database system 200 using the transaction log 260.

At an operation 605, the method 600 receives transaction log entries 265 from the transaction log 260. For example, in the illustration provided in FIG. 5, the transaction log entries 265 labelled T10 to T21 would be received. In some examples, the transaction log entries that are received may comprise a respective indication 270 of a value of the third secure counter 250 at the time the transaction log entry 265 was written (where the database system 200 maintains a third secure counter 250), a respective indication 275 of a value of the fourth secure counter 255 (where the database system 200 maintains a fourth secure counter 255) at the time the transaction log entry 265, and/or an indication of a transaction processing thread which processed the transaction to which the log entry 265 relates (where the database system 200 comprises a plurality of transaction processing threads). After receiving the transaction log entries 265, the method 600 proceeds to an optional operation 610.

At optional operation 610, the method 600 receives a latest (or current) snapshot 240. In some examples, the latest snapshot 240 comprises all previous data and delta snapshots that have been taken up to and including the most recent ones. For example, in the illustration provided in FIG. 5, the snapshot 240 representing the state of the database system after the transactions associated with log entries 265 labelled T1 to T9 had been committed would be received. Once the latest snapshot 240 has been received, the method 600 proceeds to an operation 615. Of course, in some examples, optional operation 610 may be omitted, in which case the method proceeds directly to operation 615.

At an operation 615, the method 600 receives a current value of the first secure count 220. In some examples, this may be received from the distributed monotonic counter service 300. For example, in the illustration provided in FIG. 5, the value of fifteen may be received as the current value for the first secure count 220. The method 600 then proceeds to an optional operation 620.

At optional operation 620, the method 600 receives a current value of the second secure count 245. Again, in some examples, this may be received from the distributed monotonic counter service 300. For example, in the illustration provided in FIG. 5, the value nine may be received as the current value for the second secure count 245. The method 600 then proceeds to an optional operation 625. In examples where the database system 200 does not maintain a second secure count 245, this operation may be omitted, in which case the method 600 proceeds to directly to operation 625.

At an operation 625, the method 600 receives a current value of the third secure count 250. Again, in some examples, this may be received from the distributed monotonic counter service 300. For example, in the illustration provided in FIG. 5, the value twenty one may be received as the current value for the third secure count 250. The method 600 then proceeds to an optional operation 630. In examples where the database system 200 does not maintain a third secure count 250, this operation may be omitted, in which case the method 600 proceeds directly to operation 630.

At an operation 630, the method 600 receives a current value of the fourth secure count 255. Again, in some examples, this may be received from the distributed monotonic counter service 300. The method then proceeds to an operation 635. In examples where the database system 200 does not maintain a fourth secure count 255, this operation may be omitted, in which case the method 600 proceeds directly to operation 635.

Whilst the retrieval of the current values of the secure counts is represented in FIG. 6 as four separate operations, it will be appreciated that, in other examples, the values of the secure counts may be retrieved in a single operation. For example, a single request may be made to the distributed monotonic counter service 300 to retrieve all of the secure counts at once. Equally, in other examples, the order in which the secure counts is retrieved may be changed.

At operation 635, the method 600 verifies the integrity of the transaction log 260 based on the secure counts that have been received. In some examples, the operation 635 simply verifies the transaction log 260 by determining that the correct number of transaction log entries 265 have been received.

In examples where only the first secure count 220 is maintained (and snapshotting is not supported), this can be determined by checking that the number of transaction log entries that has been received is at least equal to, if not greater than, the value of the first secure count 220. In the example illustrated in FIG. 5, such examples would verify the integrity of the transaction log if at least fifteen transaction log entries had been received.

In examples where a second secure count 245 is maintained (and snapshotting is supported), this can be determined by checking that the number of log entries that has been received is at least equal to, if not greater than, the value of the second secure count 245 subtracted from the value of the first secure count. In the example illustrated in FIG. 5, such examples would verify the integrity of the transaction log if at least six transaction log entries had been received.

In examples where a third secure count 250 is maintained, this can be determined by checking that the number of log entries that has been received does not exceed the value of the third secure count 250 (or the value of the second secure count 245 subtracted from the value of the third secure count 250 where the second secure count is also maintained). In the example illustrated in FIG. 5 (which supports snapshotting and maintains the second secure count), such examples would verify the integrity of the transaction log if the number of received transaction log entries does not exceed twelve.

In examples where the transaction log entries 265 include indications 270 of the third secure counter value 250 at the time that they are written, this can be determined by checking that the values of those indications are not less than or equal to the value of the second secure count or greater than the value of the third secure count 250. Other such examples also or alternatively check that the indicated 270 third secure counter values 250 form a complete sequence (i.e. that there are no gaps in the sequence of indicated values which would indicate a missing transaction log entry 265). In the example illustrated in FIG. 5, such examples would verify the integrity of the transaction log 260 if the third secure counter values 250 indicated 270 in each transaction log entry 265 do not include any indications less than or equal to nine or greater than twenty one and that the received indications form a complete sequence (i.e. all the values 10, 11, 12, 13, 14, 15, 16, 17, 18, 19, 20 and 21 are indicated by respective transaction log entries).

In examples where a fourth secure count 255 is maintained and the log entries 265 include indications 275 of the value of the fourth secure count 255 at the time that they are written, this can be determined by checking that the values of those indications are not less than (or are equal to) the current value of the fourth secure count 255.

If the integrity of the received transaction log entries 265 is verified, the method 600 proceeds to an operation 640. Otherwise, the method 600 terminates without restoring the database due to the integrity of the transaction log entries 265 being compromised. In other examples, the method 600 may provide a warning to the user that the integrity of the transaction log entries 265 has been compromised. In yet further examples, the method 600 may permit the user to ignore such warnings and restore the database anyway.

At an operation 640, the method 600 restores the database based on the received transaction log entries 265 and, where a snapshot 240 is received, on the received snapshot 240.

In some examples, the restoration is based on received value of the first secure count 220. In some such examples, the database is restored by replaying the transaction log entries 245 until a number of log entries equal to the first secure count 220 has been replayed.

In other examples, where a second secure count 245 is maintained, the restoration is further based on the value of the second secure count 245. In some such examples, the database is restored by replaying the transaction log entries until a number of log entries equal to the second secure count 245 subtracted from the first secure count 220 has been replayed.

In other examples, where indications 270 of a respective third secure count 250 are included in each of the transaction log entries 265, the restoration is further based on the indications 270 contained in each of the transaction log entries 265. In some such examples, the restoration of the database ignores (or excludes) any transaction log entries 265 for hidden transactions, that is transaction log entries 265 where the indication 270 of the third secure count 250 is greater than the current value of the first secure count 220. In other such examples, the restoration of the database ignores (or excludes) transaction log entries which have been truncated, that is, where the indication 270 of the third secure count 250 is less than the current value of the second secure count 245.

In other examples, where the database system 200 maintains a fourth secure counter 255 and the transaction log entries 265 each include an indication 275 of a value of the fourth secure count 255 at the time the transaction log entry was written, the restoration is further based on the current value of the fourth secure counter 255 and the indications 270 contained in each of the transaction log entries 265. In such examples, the restoration of the database ignores (or excludes) any transaction log entries 265 having an indicated 275 fourth secure count 255 value which is less than the current value of the fourth secure count 255.

At optional operation 645, the method 600 determines whether any of the received transaction log entries related to hidden (i.e. non-committed) transactions. This is determined by comparing the value of the third secure count 250 with that of the first secure count 220. If the third secure count 250 was greater than the first secure count 220 then that indicates that log entries relating to hidden transactions may be present in the received transaction log entries 265. If it is determined that the received transaction log entries 265 may include transaction log entries 265 related to hidden transactions, then the method proceeds to optional operation 650. Of course, in some examples, where a fourth secure count 255 is not maintained by the database system 200, operations 645 and 650 may be omitted, in which case the method 600 simply terminates.

At optional operation 650, the method 600 takes a new snapshot of the entire transaction log 260. This ensures that all of the log entries 265 relating to transactions which have been committed to the database are included in the latest snapshot 240. After the snapshot has been created, the method 900 proceeds to an optional operation 655.

At optional operation 655, the method 600 increments the fourth secure count 255. Incrementing the fourth secure count serves to invalidate all previously written transaction log entries 265, including any hidden transaction that might have been present during restoration of the database. This prevents any hidden transactions from being maliciously reused because, in examples in which the database system 200 maintains the fourth secure count, each transaction log entry 265 includes an indication 275 of the value of the fourth secure count 255 at the time the entry 265 is written to the log. Therefore, the database system 200 can ignore all transactions which indicate a value which is less the current value of the fourth secure count 255.

Alternatively or in addition to the other examples described herein, examples include any combination of the following:

A database system configured such that at least part of the database system is configured to be executed within a trusted execution environment, the database system comprising: a transaction logger configured to write transaction log entries to a transaction log stored outside of the trusted execution environment, each of the transaction log entries representing a transaction processed by the database system; a first secure counter configured to maintain a representation of the number of transaction log entries which have been written to the transaction log for transactions which have been committed to the database; and a restoration module configured to restore the database system based, at least in part, on transaction log entries retrieved from the transaction log and a current value of the first secure counter.

The database system described above further comprising: a log truncation module configured to truncate the transaction log by generating a snapshot representing the state of the database system at a particular point in time and truncating all transaction log entries for transactions occurring before that point in time; and a second secure counter configured to maintain a representation of the number of transaction log entries which have been truncated by the log truncation module, wherein the restoration module is further configured to restore the database system based additionally on a latest snapshot of the database system and a current value of the second secure counter.

The database system described above further comprising: a third secure counter configured to maintain a representation of the number of transaction log entries which have been written to the transaction log, wherein: each transaction log entry written to the transaction log by the transaction logger comprises a respective indication of the value of the third secure counter at the time that the transaction log entry was written; and the restoration module is further configured to restore the database system based additionally on a latest snapshot and the respective values of the third secure counter indicated by each of the transaction log entries.

The database system described above further comprising: a plurality of transaction processing threads, wherein each of the transaction log entries written to the transaction log comprise a respective indication of the transaction processing thread which processed the transactions represented by that transaction log entry, wherein each of the separate transaction processing threads is associated with a separate respective first, second and third secure counter and the restoration module is further configured to restore the database system based additionally on the indication of the transaction processing thread in each transaction log entry and the respective first, second and third secure counters for each transaction processing thread.

The database system described above further comprising: a fourth secure counter configured to be incremented during restoration of the database system by the restoration module at least when a value of the third secure counter at the time of restoration is greater than a value of the first counter at the time of restoration, wherein: each transaction log entry written to the transaction log by the transaction logger comprises a respective indication of the value of the fourth secure counter at the time that the transaction log entry was written; and the restoration module is further configured to restore the database system based additionally on a current value of the fourth secure counter and the respective values of the fourth secure counter indicated by each of the transaction log entries.

The database system described above, wherein the restoration module is further configured to ignore, during restoration of the database system, one or more or all of: transaction log entries which include an indication of a value for the third secure counter which is less than or equal to the current value of the second secure counter; transaction log entries which include an indication of a value for the third secure counter which is greater than the current value of the first secure counter; transaction log entries which include an indication of a value for the fourth secure counter which is less than the current value of the fourth secure counter.

The database system described above, wherein the restoration module is further configured to verify that the integrity of the received transaction log entries has been preserved, by determining that the values of the third secure counter indicated by each of the transaction log entries forms a complete sequence.

The database system described above, wherein the restoration module is further configured to verify that the integrity of the received transactions has been preserved, by: determining that the number of received transaction log entries is not less than the current value of the first secure counter less the current value of the second counter; and determining that the number of received transaction log entries is not greater than the current value of the third secure counter less the current value of the second counter.

The database system described above, wherein the database system is configured to encrypt each of the transaction log entries using a securely stored encryption key.

The database system described above where the secure counters are monotonic counters.

The database system described above, wherein the monotonic counters are provided by a distributed monotonic counter service, the distributed monotonic counter service comprising two or more replicated instances, the two or more replicated instances being distributed across more than one fault domain, wherein the distributed monotonic counter service is configured to determine a current value of each secure count using a consensus protocol between two or more or all of the replicated instances.

A computer-implemented method for writing transaction log entries to a transaction log for a database system, wherein at least part of the database system is configured to be executed within a trusted execution environment and the transaction log is stored outside of the trusted execution environment, the method comprising: maintaining a first secure count representing a number of transaction log entries which have been written to the transaction log for transactions which have been committed to the database; and writing a transaction log entry to the transaction log.

The method described above, further comprising: maintaining a third secure count representing a number of transaction log entries which have been written to the transaction log, wherein the transaction log entry that is written to the transaction log comprises an indication of a value of the third secure count at the time the transaction log entry is written.

The method described above, wherein the database system comprises a plurality of transaction processing threads and wherein the transaction log entry that is written to the transaction log further comprises an indication of the transaction processing thread which processed the transaction represented by the transaction log entry.

The method described above, wherein the database system maintains a fourth secure count representing a number of times the database has been restored and transaction log entries related to non-committed transactions have been detected and wherein the transaction log entry that is written to the transaction log further comprises an indication of a value of the fourth secure count at the time the transaction log entry is written.

The method described above further comprising encrypting the transaction log entry that is written to the transaction log using a securely stored encryption key.

A computer-implemented method for restoring a database system, wherein at least a part of the database system is configured to be executed within a trusted execution environment, the method comprising: receiving one or more transaction log entries retrieved from a transaction log stored outside of the trusted execution environment, each of the one or more transaction log entries representing a transaction processed by the database system; and receiving a current value of a first secure count maintained by the database system, the first secure count representing the number of transaction log entries which have been written to the transaction log for transactions which have been committed to the database; verifying the integrity of the transaction log based, at least in part, on the current value of the first secure count by determining that a correct number of transaction log entries has been received; and in response to verifying the integrity of the received transaction log entries, restoring the database using the received transaction log entries and the current value of the first secure count.

The method for restoring a database system described above, wherein the database system is configured to truncate the transaction log by generating a snapshot representing the state of the database system at a particular point in time and truncating all transaction log entries for transactions occurring before that point in time, the method further comprising: receiving a latest snapshot of the database system; and receiving a current value of a second secure count maintained by the database system, the second secure count representing the number of transaction log entries which have been truncated, wherein: verifying the integrity of the transaction log entries by determining that a correct number of transaction log entries has been received is further based on the current value of the second secure count; and restoring the database comprises applying the transactions represented by the received transaction log entries to the database state represented by the latest snapshot of the database system.

The method for restoring a database system described above further comprising: receiving a current value of a third secure count maintained by the database system, the third secure count representing the number of transaction log entries which have been written to the transaction log, wherein each of the transaction log entries comprises a respective indication of the value of the third secure count at the time that the transaction log entry was written; wherein: verifying the integrity of the transaction log entries by determining that a correct number of transaction log entries has been received is further based on the current value of the third secure count; verifying the integrity of the transaction log entries further comprises determining that the values of the third secure count indicated in each of the received transaction log entries forms a complete sequence; and restoring the database using the received transaction log entries comprises ignoring any transaction log entries which include an indication of the third secure count which is greater than the current value of the first secure counter and/or less than the current value of the second secure counter.

The method for restoring a database system described above further comprising: receiving a current value of a fourth secure count maintained by the database system, the fourth secure count representing the number of times the database has been restored and transaction log entries related to non-committed transactions have been detected, wherein each of the transaction log entries comprises a respective indication of the value of the third secure count at the time that the transaction log entry was written; wherein: verifying the integrity of the transaction log entries further comprises determining that the values of the fourth secure count indicated in each of the received transaction log entries forms is not less than the current value of the fourth secure count; and/or restoring the database using the received transaction log entries comprises ignoring any transaction log entries which include an indication of the fourth secure count which is greater than the current value of the fourth secure count.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A database system comprising:
   a processor; and
   a memory storing a database and program instructions that, when executed by the processor, perform operations comprising:
   writing first, second, and third transaction log entries, for the database, into a transaction log stored outside of a trusted execution environment;
   truncating the first transaction log entry from the transaction log, and leaving the second and third transaction log entries, the truncating of the first transaction log entry being based on the first transaction log entry being committed, and the second and third transaction log entries not being committed, at a time a snapshot of the database is taken;
   committing the second transaction log entry, wherein the committing of any transaction log entry comprises confirming that the corresponding transaction is committed to the database system,
      wherein transaction log entries are written to the transaction log before the confirmation is provided;
   maintaining a committed transactions counter indicating a number of committed transaction log entries that have been written to the transaction log,
      wherein the number of committed transaction log entries is incremented by the committed transactions counter in response to the committing of the second transaction log entry;
   maintaining a truncated entries counter indicating a number of truncated transaction log entries; and
   retrieving at least the second and third transaction log entries from the transaction log, the retrieving excluding the first transaction log entry based on the first transaction log entry being truncated from the transaction log;
   determining, based at least in part on a numerical comparison involving a current value of the committed transactions counter, a current value of the truncated entries counter, and a number of the truncated transaction log entries that have been retrieved by the retrieving, that an integrity of the transaction log has been preserved; and
   in response to determining that the integrity of the transaction log has been preserved, of the first transaction log entry, the second transaction log entry, and the third transaction log entry, replaying only a transaction defined in the second transaction log entry based on the second transaction log entry being both not truncated and committed, wherein the replaying of the transaction restores the database system.

2. The database system of claim 1, wherein:
the writing of the first, second, and third transaction log entries comprises inserting into a respective transaction log entry a respective indication of a value of a logged transactions counter at a time that the respective transaction log entry was written; and
the restoring of the database is based additionally on the snapshot and a current value of the logged transactions counter.

3. The database system of claim 2, wherein:
the writing of the first, second, and third transaction log entries comprises inserting into the respective transaction log entry a respective indication of a value of an epoch counter at the time that the respective transaction log entry was written, wherein the epoch counter indicates a number of times the database was restored; and
the restoring of the database is based additionally on a current value of the epoch counter and respective values of the epoch counter indicated by the respective transaction log entries.

4. The database system of claim 3, wherein the restoring of the database comprises ignoring, by not replaying, one or more of the following:
- a transaction log entry that includes an indication of a value for the logged transactions counter which is less than or equal to a current value of the truncated entries counter;
- a transaction log entry that includes an indication of a value for the logged transactions counter which is greater than a current value of the committed transactions counter; and
- a transaction log entry that includes an indication of a value for the epoch counter which is less than a current value of the epoch counter.

5. The database system of claim 1, wherein the program instructions, when executed by the processor, verify integrity of the transaction log.

6. The database system of claim 1, wherein:
- the writing of the first, second, and third transaction log entries is performed by a first transaction processing thread, the first, second and third transaction log entries comprising an indication corresponding to the first transaction processing thread;
- the committed transactions counter, the truncated entries counter, and a logged transactions counter are associated with the first transaction processing thread and exclude from their respective counts transaction log entries written to the transaction log by a second transaction processing thread; and
- the restoring of the database is based additionally on the indication corresponding to the first transaction processing thread in the first, second, and third transaction log entries, the committed transactions counter, the truncated entries counter, and the logged transactions counter for the first transaction processing thread, and an indication in a fourth transaction log entry corresponding to the second transaction processing thread, and a second committed transaction counter, a second truncated entries counter, and a second logged transactions counter corresponding for the second transaction processing thread.

7. The database system of claim 1, wherein the committed transactions counter and the truncated entries counter are monotonic counters provided by a distributed monotonic counter service, the distributed monotonic counter service comprising two or more replicated instances, the two or more replicated instances being distributed across more than one fault domain, wherein the distributed monotonic counter service is configured to, when executed by the processor, determine a current value of a count of the committed transactions counter and the truncated entries counter using a consensus protocol between two or more of the replicated instances.

8. A computer-implemented method for restoring a database system, the method comprising:
- writing a transaction log entry to a transaction log;
- concomitant with the writing of the transaction log entry, incrementing a logged transactions counter to a current value;
- retrieving from the transaction log the transaction log entry and another transaction log entry;
- comparing the current value of the logged transactions counter to a number of transaction log entries that have been retrieved;
- verifying that an integrity of the transaction log has been preserved based at least in part on the comparing; and
- restoring the database system in response to the verifying that the integrity of the transaction log has been preserved.

9. The computer-implemented method of claim 8, wherein;
- the transaction log entry written to the transaction log comprises an indication of a value of the logged transactions counter at a time that the transaction log entry was written; and
- the restoring of the database system is based on at least a latest snapshot and the indication of the value of the logged transactions counter in the transaction log entry.

10. The computer-implemented method of claim 9, wherein:
- the transaction log entry written to the transaction log comprises an indication of a value of an epoch counter at the time that the transaction log entry was written, the epoch counter indicating a number of times the database system was restored; and
- the database system is restored based on at least a current value of the epoch counter and a value the epoch counter indicated by the transaction log entry.

11. The computer-implemented method of claim 8, further comprising:
- truncating a second transaction log entry from the transaction log; and
- concomitant to the truncating of the second transaction log entry, updating a truncated entries counter to a current value of the truncated entries counter.

12. The computer-implemented method of claim 11, wherein the logged transactions counter and the truncated entries counter are monotonic counters.

13. The computer-implemented method of claim 8, further comprising encrypting the transaction log entry using a securely stored encryption key.

14. An apparatus for restoring a database system, the apparatus comprising:
- a processor; and
- a computer-readable storage medium including computer-executable instructions that, when executed by the processor, cause the apparatus to:
  - write a transaction log entry to a transaction log;
  - truncate the transaction log entry from the transaction log;
  - maintain a logged transactions counter comprising a representation of a number of transaction log entries that have been written to the transaction log, wherein the logged transactions counter is incremented concomitant with the writing of the transaction log entry to the transaction log;
  - maintain a truncated entries counter comprising a representation of a number of truncated transaction log entries, wherein the truncated entries counter is updated concomitant with the truncating of the transaction log entry from the transaction log;
  - retrieve from the transaction log a number of retrieved transaction log entries;
  - determine, by subtracting, a difference between a current value of the logged transactions counter and a current value of the truncated entries counter;
  - compare the difference with the number of retrieved transaction log entries;
  - verify that an integrity of the transaction log has been preserved based at least in part on the comparing; and restore the database system using the transaction log in response to the verifying that the integrity of the retrieved transaction log has been preserved.

15. The apparatus of claim 14, wherein:

the transaction log entry written to the transaction log comprises an indication of a value of the logged transactions counter at a time that the transaction log entry was written; and the restoring of the database system is based on at least a latest snapshot and the indication of the value of the logged transactions counter in the transaction log entry.

16. The apparatus of claim 15, wherein:

the transaction log entry written to the transaction log comprises an indication of a value of an epoch counter at the time that the transaction log entry was written, the epoch counter indicating a number of times the database system was restored; and the database system is restored based on at least a current value of the epoch counter and a value the epoch counter indicated by the transaction log entry.

17. The apparatus of claim 16, wherein the restoring of the database system comprises ignoring, by not replaying, one or more of the following:

a transaction log entry that includes an indication of a value for the logged transactions counter which is less than or equal to a current value of the truncated entries counter;

a transaction log entry that includes an indication of a value for the logged transactions counter which is greater than the current value of the committed transaction log entries, the number of committed transaction log entries being maintained by a committed transactions counter that is incremented upon confirming that a transaction is committed to the database system; and a transaction log entry that includes an indication of a value for the epoch counter which is less than a current value of the epoch counter.

18. The apparatus of claim 14, wherein the computer-executable instructions further cause the apparatus to commit the transaction log entry, wherein a committed transactions counter is incremented concomitant to the committing of the transaction log entry, wherein the committing of any transaction log entry comprising confirming that the corresponding transaction is committed to the database system, wherein the transaction log entry is written to the transaction log before the confirmation is provided.

19. The apparatus of claim 14, wherein the logged transactions counter and the truncated entries counter are monotonic counters.

20. The apparatus of claim 14, wherein;

the transaction log is stored outside of a trusted execution environment;

the writing of the transaction log entry to the transaction log is performed by a transaction logger; and the truncating of the transaction log entry is performed by a log truncator.

\* \* \* \* \*